United States Patent
Shieh et al.

(10) Patent No.: US 7,317,575 B2
(45) Date of Patent: Jan. 8, 2008

(54) TUNABLE DISPERSIVE OPTICAL SYSTEM

(75) Inventors: Kuen-Wey Shieh, Hsinchu (TW); Jerwei Hsieh, Hsinchu (TW); Hsiao-yu Chou, Hsinchu (TW)

(73) Assignee: Instrument Technology Research Center (TW)

( * ) Notice: Subject to any disclaimer, the term of this patent is extended or adjusted under 35 U.S.C. 154(b) by 242 days.

(21) Appl. No.: 11/181,160

(22) Filed: Jul. 14, 2005

(65) Prior Publication Data

US 2006/0169881 A1    Aug. 3, 2006

(30) Foreign Application Priority Data

Feb. 3, 2005    (TW) .............................. 94103476 A (51) Int. Cl.
G02B 27/00    (2006.01)
G02B 26/00    (2006.01)
G02F 1/03    (2006.01)

(52) U.S. Cl. ....................... 359/578; 359/254; 359/573; 359/569

(58) Field of Classification Search ................ 359/254, 359/578, 579, 573; 250/237 R
See application file for complete search history.

(56) References Cited

U.S. PATENT DOCUMENTS

| 6,445,502 | B1 * | 9/2002 | Islam et al. ................. 359/571 |
| 6,643,065 | B1 * | 11/2003 | Silberman .................... 359/573 |
| 6,753,994 | B1 * | 6/2004 | Russell ....................... 359/254 |
| 6,829,092 | B2 * | 12/2004 | Amm et al. ................. 359/573 |

* cited by examiner

Primary Examiner—Audrey Chang
(74) Attorney, Agent, or Firm—The Webb Law Firm (57) ABSTRACT

A novel dispersion optical system based on at least one grating is provided. The pitches of the grating are linearly modulated so that the incident light is dispersed into different monochromatic light at different diffraction angles. In such a system, an order sorting filter is not required to separate the light of a selected order from the rest of unwanted overlapped order.

5 Claims, 10 Drawing Sheets

TUNABLE DISPERSIVE OPTICAL SYSTEM

FIELD OF THE INVENTION

The present invention relates to a dispersive optical system, and more specifically to a tunable dispersive optical system with diffraction gratings.

BACKGROUND OF THE INVENTION

A grating is an optical device formed by a plurality of fine structures which is arranged orderly. When an energy beam, such as a light beam is incident on the gating, the light illuminated on the grating surface of the grating can be diffracted to different angles predicted by the basic grating equation as follows:

$$d(\sin(\alpha)+\sin(\beta))=m\lambda \quad (1)$$

where d denotes the grating pitch, $\alpha$ the incident angle, $\beta$ denotes the diffraction angle, m denotes the diffraction order, and $\lambda$ denotes the wavelength of the diffracted light. Therefore, the grating can serve as an optical filter.

Figure 1:
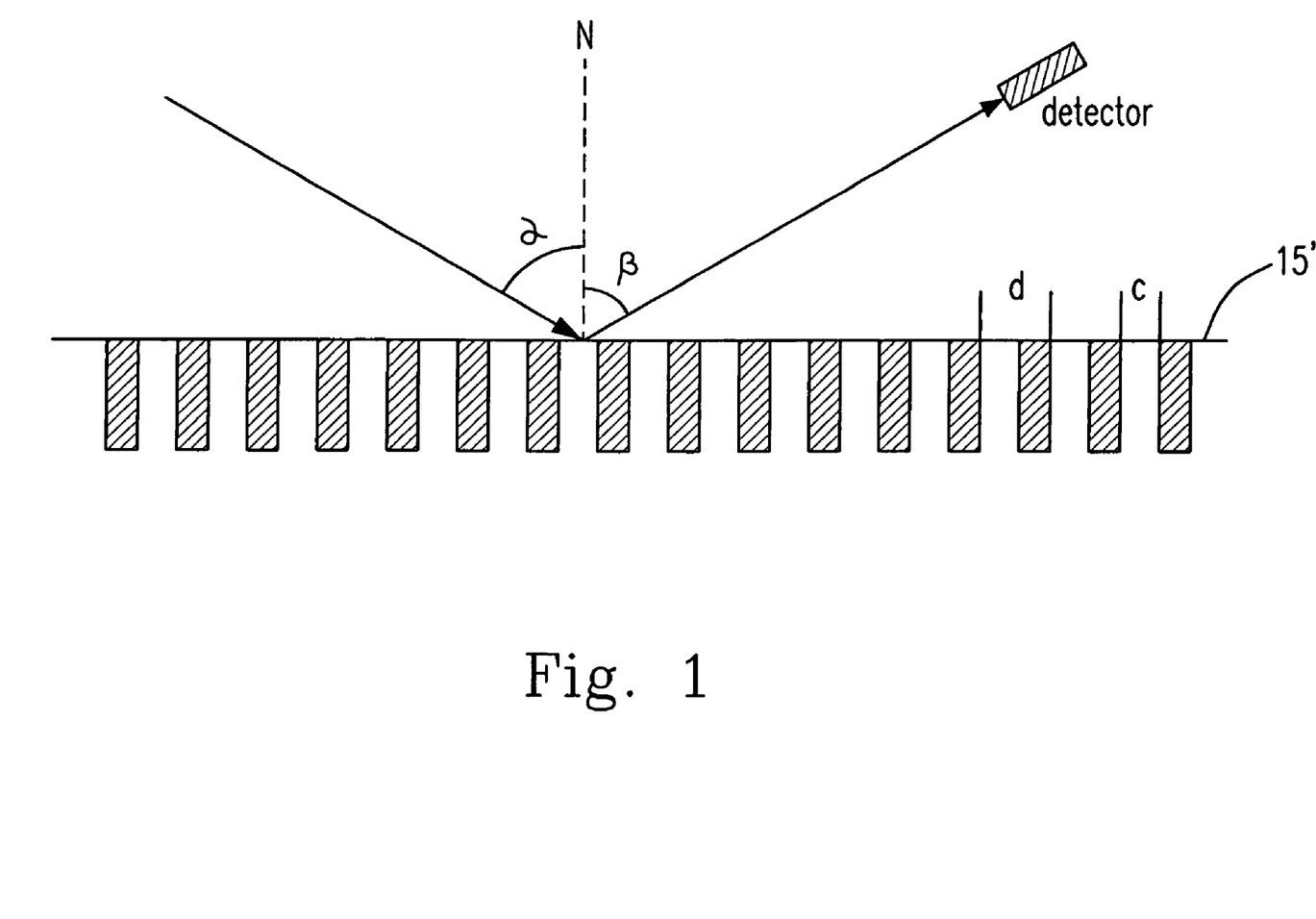
FIG. 1 is a diagram illustrating a typical grating structure according to the prior art.

Please refer to FIG. 1, which shows the structure of a typical diffraction grating. As can be known from FIG. 1, when an energy beam is irradiated into a grating plane 15' at an incident angle, the diffracted energy beam with the diffraction order m and the wavelength $\lambda$ would be detected at the diffraction angle $\beta$. Meanwhile, as can be predicted from the equation (1), further diffracted energy beams, such as the diffracted energy beam with diffraction order 2m and the wavelength $\lambda/2$ and other diffracted energy beam in case the product of the diffraction order and the wavelength remains the same, can be detected at the same diffraction angle $\beta$. Therefore, the diffracted energy beam detected at the diffraction angle $\beta$ includes an overlapped energy beam in successive orders and multiple wavelengths.

On the other hand, it also can be seen from the equation (1) that the wavelength of the diffracted energy beam would be modulated with the change of the grating pitch. With such modulation, a monochromatic energy beam can be separated from an energy beam with a continuous spectrum. Therefore, the grating as FIG. 1 can be used for the various dispersive optical systems, such as the spectrometer, the optical communication component, and the resonance cavity of laser, etc.

However, a disadvantage in such grating as shown in FIG. 1 is that the gap width c between two teeth increases with the grating pitch d. As a result, only a small portion of the incident light (or energy beam) can be diffracted by the grating and contributes to the light collected by the detector. Therefore, the diffraction efficiency decreases with the grating pitch d.

Figure 2A:
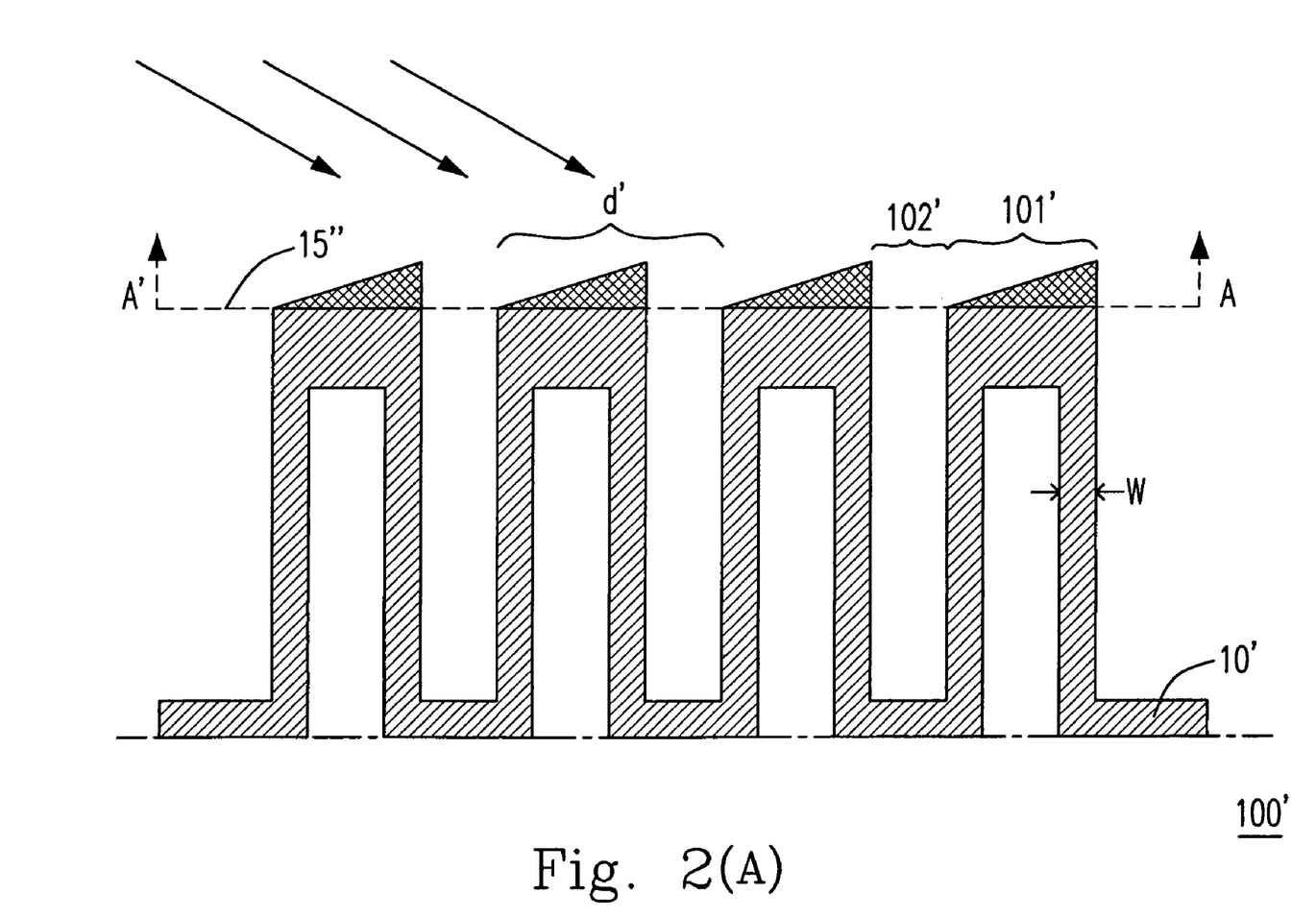
FIG. 2(A) is a top view diagram of a pitch-tunable grating structure according to the prior art.
Figure 2B:
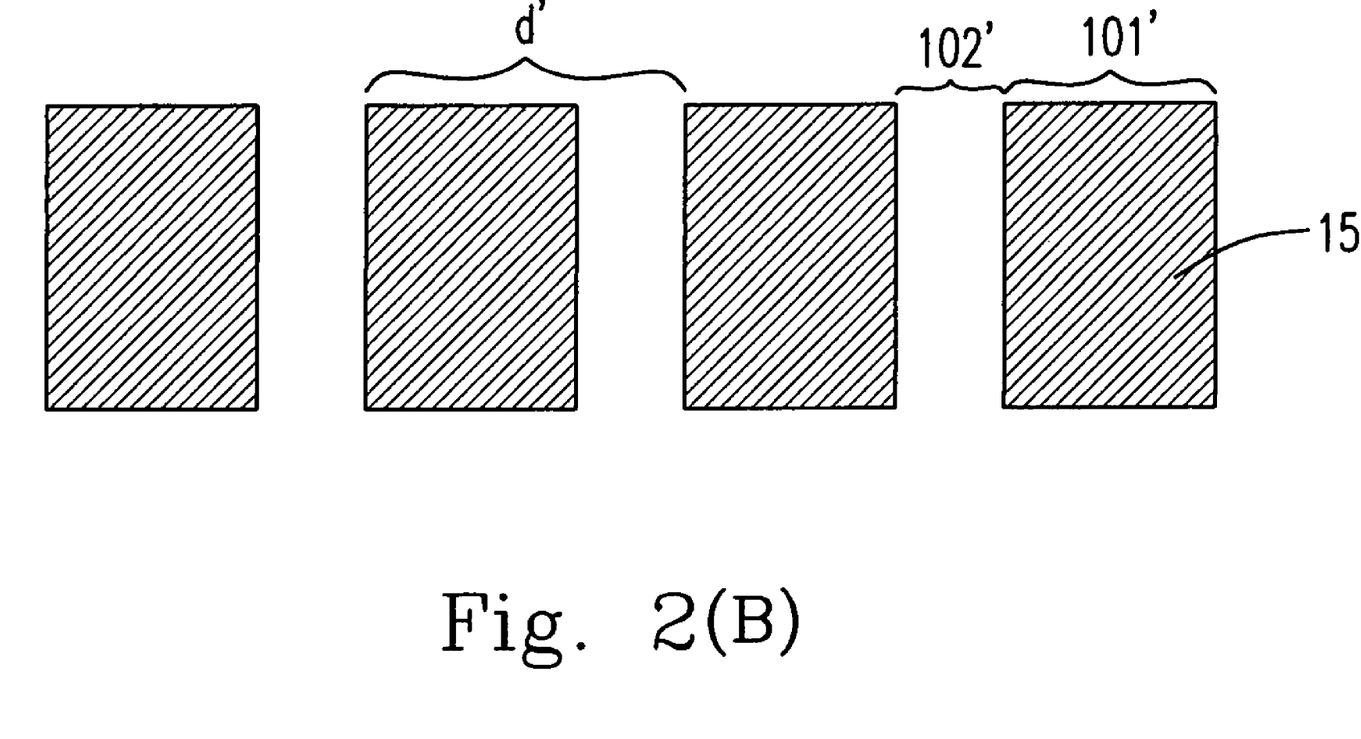
FIG. 2(B) shows a grating plane AA' of the pitch-tunable grating structure of FIG. 2(A)

Furthermore, please refer to FIG. 2(A), which shows a top view of a further typical grating structure. The main structure of the grating 100' is formed on a substrate and manufactured with the MEMS-based process. Furthermore, the main structure of the grating 100' is manufactured in a form of a resilient set, such as, a spring set, in order to form a pitch-tunable grating. As can be seen from FIG. 2(A), the grating 100' is formed by a resilient set 10', on which a grating plane 15" is formed on the cross section plane AA' of the side wall of the resilient set 10'. The grating plane, which can be seen from FIG. 2(B), includes a plurality of support units 101' and gaps 102' arranged orderly and alternately. A grating pitch d' is formed by each support unit and gap width. Because the grating 100' is formed by the resilient set 10', the grating pitch d is tunable if a deformation of the resilient set 10' occurs.

It can be seen from FIG. 2(A), the smallest pitch of the grating is the same as the width of the support unit 101'. Therefore, the attainable grating pitch is constrained by the width of the support unit 101', which is inevitably much broader than the minimum line-width of the grating structure, and thus resulting in much smaller modulation range of the grating pitch d.

Accordingly, it is the first aspect of the present invention to provide a novel grating structure, with which the broader modulation range of the grating pitch is achieved. Furthermore, it is a second aspect of the present invention to provide a method in which an order sorting filter is not required to separate a light of a selected order from the rest of the unwanted overlapping orders.

SUMMARY OF THE INVENTION

It is a first aspect of the present invention to provide a novel diffraction grating including a resilient set including a plurality of support units with a support unit width and first gaps with a first gap width arranged alternately, a grating plane disposed on the resilient set and including a plurality of teeth with a tooth width and second gaps with a second gap width arranged alternately, and a plurality of extending arms connecting the support units to the teeth, respectively.

Preferably, a modulation pitch d' is formed by the support unit width and the first gap width, a grating pitch d is formed by the tooth width and the second gap width, and the modulation pitch d' is greater than the grating pitch.

Preferably, an energy beam illuminated from the grating plane is diffracted into a diffracted energy beam, and an equation, $d(\sin(\alpha))+\sin(\beta))=m\lambda$, is satisfied, wherein d denotes the grating pitch, $\alpha$ denotes an incident angle of the energy beam, $\beta$ denotes a diffraction angle of the diffracted energy beam, m denotes a diffraction order, and $\lambda$ denotes a wavelength of the diffracted energy beam.

Preferably, the first gap width is modulated by a deformation of the resilient set.

Preferably, the modulation pitch d' and the grating pitch d are varied with the first gap width.

Preferably, the wavelength $\lambda$ of the diffracted energy beam is modulated by varying the grating pitch d.

It is a second aspect of the present invention to provide a further grating for dispersing an energy beam, including a grating plane having a plurality of teeth with a length and gaps with a width disposed alternately.

Preferably, the length increases along a modulation direction of the width.

Preferably, the energy beam is incident in a direction parallel to the modulation direction of the gap width.

Preferably, the grating plane is tilted to the modulation direction of the width.

It is a third aspect of the present invention to provide a method for separating a beam at an arbitrary wavelength from an energy beam with continuous spectrum. The method includes the steps of (1) providing a grating for diffracting an energy beam to a diffracted beam, wherein an equation, $d(\sin(\alpha)+\sin(\beta))=m\lambda$, is satisfied, wherein d denotes a grating pitch, $\alpha$ denotes an incident angle of the energy beam, $\beta$ denotes a diffraction angle of the diffracted beam, m denotes a diffraction order, and $\lambda$ denotes a wavelength of the diffracted beam; (2) disposing a detector in a direction of the diffraction angle $\beta$ for receiving the diffracted beam in diffraction order m and at wavelength $\lambda_m$, where m is an integer (1 or −1) and $\lambda_m$ is the shortest wavelength over the spectrum of interest; (3) modulating the grating pitch continuously for receiving a first power of the diffracted beam in diffraction order m and at wavelengths from $\lambda_m$ to $2\lambda_m^-$, a wavelength less than $2\lambda_m$, so that the spectrum in the range of $\lambda_m$ to $2\lambda_m^-$ is obtained; (4) further continuously modulating the grating pitch for receiving a second power of the diffracted beam in diffraction order m and at wavelengths from $2\lambda_m$ to $3\lambda_m^-$ a wavelength less than $3\lambda_m$, wherein the second power accompanies that in diffraction order 2m and at wavelengths from $\lambda_m$ to $(3/2)\lambda_m^-$; (5) subtracting the first power from the second power for obtaining each power of the diffraction beam at wavelengths from $2\lambda_m$ to $3\lambda_m^-$; (6) further continuously modulating the grating pitch for receiving a third power of the diffracted beam in diffraction order m and at wavelengths from $3\lambda_m$ to $4\lambda_m^-$, a wavelength less than $4\lambda_m$, wherein the third power accompanies that in diffraction order 2m and at wavelengths from $(3/2)\lambda_m$ to $(4/2)\lambda_m^-$ and that in diffraction order 3m and at wavelengths from $(3/3)\lambda_m$ to $(4/3)\lambda_m^-$; (7) subtracting the first and second power in corresponding wavelengths from the third power for obtaining each power of the diffraction beam at wavelengths from $3\lambda_m$ to $4\lambda_m^-$; and (8) iteratively repeating steps (6) and (7) for receiving a fourth, fifth, . . . , and nth power in overlapped orders and subtracting the overlapped power by each corresponding power obtained in preceding steps, so that each power from $\lambda_m$ to $n\lambda_m$ is obtained.

It is a fourth aspect of the present invention to provide a novel tunable dispersive optical system. The tunable dispersive optical system includes a first grating having a first grating pitch $d_1$, disposed in such a way that an energy beam incident at an angle $\alpha$ is diffracted by the first grating so as to generate a first diffracted energy beam at a diffraction angle $\beta$; a second grating having a second grating pitch $d_2$, disposed in such a way that the first diffracted energy beam directed thereinto at the incident angle $\alpha$ is further diffracted by the second grating so as to generate a second diffracted energy beam; and a beam expander disposed on a propagation path of the first diffracted energy beam.

Preferably, a ratio of the first grating pitch $d_1$ to second grating pitch $d_2$ is equal to m/m', wherein m denotes a diffraction order of the first diffracted energy beam, m' denotes a diffraction order of the second diffracted energy beam, and m and m' do not have common factors except for unity.

Preferably, the wavelengths of the first and second diffracted energy beams are modulated by varying the first and second grating pitches $d_1$ and $d_2$.

Preferably, the beam expander includes a combination of two lenses and a slit.

It is a fifth aspect of the present invention to provide a method for separating a beam at an arbitrary wavelength from an energy beam with continuous spectrum. The method includes the steps of (1) providing a first grating having a first grating pitch $d_1$, so that an energy beam illuminating thereinto is incident at an incident angle $\alpha$ and diffracted at an diffraction angle $\beta$ for forming a first diffracted energy beam; (2) providing a second grating having a second grating pitch $d_2$, so that the first diffracted energy beam is further directed thereinto at the incident angle $\alpha$ and further diffracted at the diffraction angle $\beta$ for forming a second diffracted energy beam; (3) disposing a detector in a direction of the diffraction angle $\beta$ for receiving the second diffracted beam in diffraction order m and at wavelength $\lambda_m$, where $\lambda_m$ is the shortest wavelength over the spectrum of interest; (4) modulating the grating pitch continuously for receiving a first power of the second diffracted beam in diffraction order m and at wavelengths from $\lambda_m$ to $2\lambda_m^-$, a wavelength less than $2\lambda_m$, so that the spectrum in the range of $\lambda_m$ to $2\lambda_m^-$ is obtained; (5) further continuously modulating the grating pitch for receiving a second power of the second diffracted beam in diffraction order m and at wavelengths from $2\lambda_m$ to $3\lambda_m^-$, a wavelength less than $3\lambda_m$, wherein the second power accompanies that in diffraction order 2m and at wavelengths from $\lambda_m$ to $(3/2)\lambda_m^-$; (6) subtracting the first power from the second power for obtaining each power of the diffraction beam at wavelengths from $2\lambda_m$ to $3\lambda_m^-$; (7) further continuously modulating the grating pitch for receiving a third power of the second diffracted beam in diffraction order m and at wavelengths from $3\lambda_m$ to $4\lambda_m^-$, a wavelength less than $4\lambda_m$, wherein the third power accompanies that in diffraction order 2m and at wavelengths from $(3/2)\lambda_m$ to $(4/2)\lambda_m^-$ and that in diffraction order 3m and at wavelengths from $(3/3)\lambda_m$ to $(4/3)\lambda_m^-$; (8) subtracting the first and second power in corresponding wavelengths from the third power for obtaining each power of the diffraction beam at wavelengths from $3\lambda_m$ to $4\lambda_m^-$; and (9) iteratively repeating steps (7) and (8) for receiving a fourth, fifth, . . . , and nth power in overlapped orders and subtracting the overlapped power by each corresponding power obtained in preceding steps, so that each power from $\lambda_m$ to $n\lambda_m$ is obtained.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 3A:
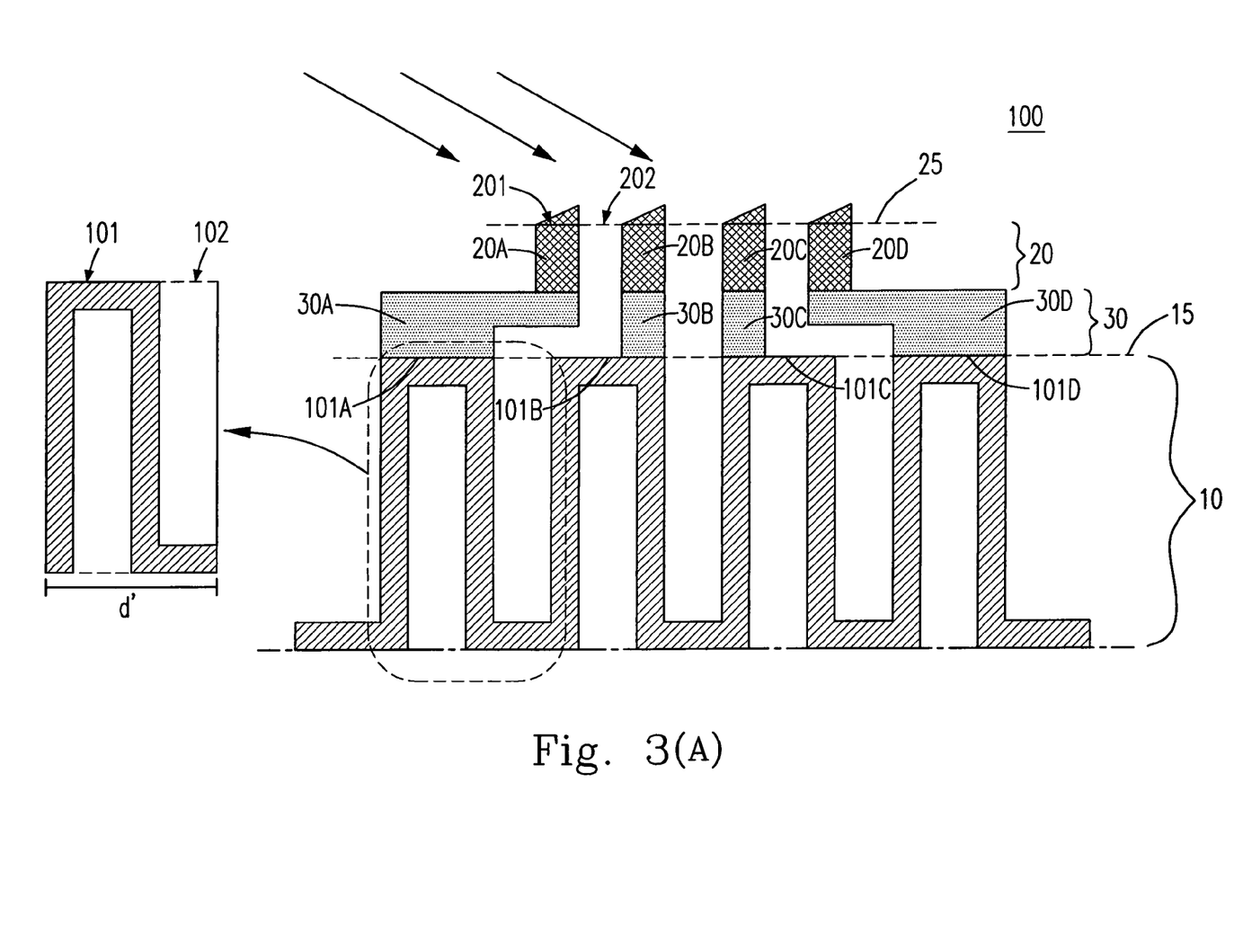
FIG. 3(A) is a top view diagram of a pitch-tunable grating structure according to a first embodiment of the present invention.
Figure 3B:
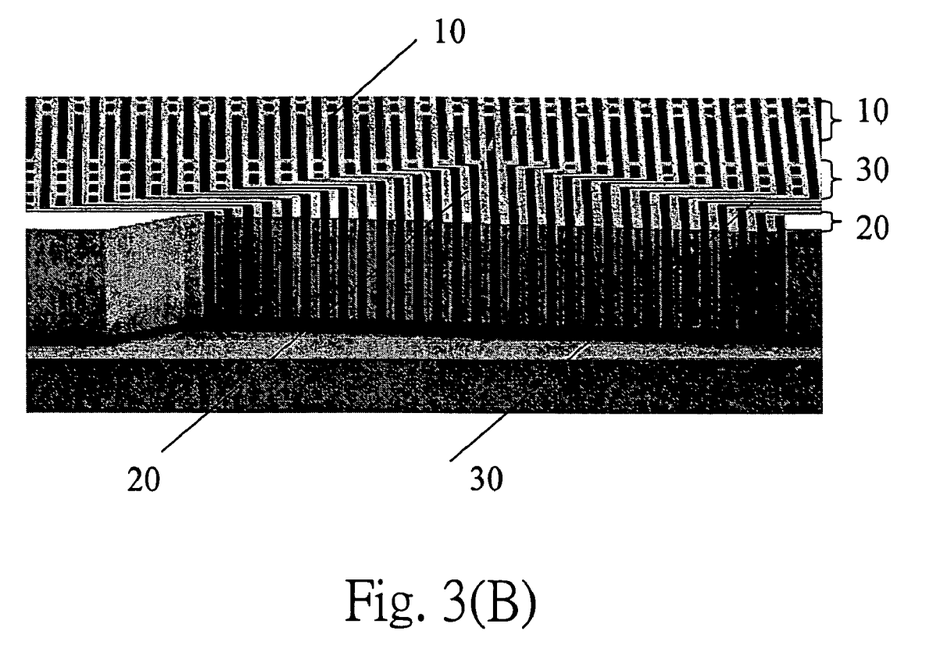
FIG. 3(B) shows an electron microscope picture of the pitch-tunable grating structure of FIG. 3(A)

Please refer to FIG. 3, which shows a top view diagram of the pitch-tunable grating structure according to the first embodiment of the present invention. In this first embodiment of the present invention, in addition to retaining the pitch-tunable function, the grating according to the first embodiment of the present invention is also designed in such a way that the minimum grating pitch is approaching the line-width of the grating structure, and hence increasing the modulation range of the grating pitch. As can be seen from FIG. 3, the grating 100 includes a zigzagged resilient set 10, a plurality of teeth-gap sets 20 and a plurality of extending arms 30. On the one side of the zigzagged resilient set 10, a modulation cross-section 15 is formed by the outer surfaces 101 of the zigzagged resilient set 10 and the first gaps 102. Specifically, from the side views of the zigzagged resilient set 10, each section of the outer surfaces 101 of the resilient set 10 is formed as a support unit for supporting the corresponding tooth 20A-20D, and a modulation pitch d' is formed by each support unit width and each first gap width, as mentioned in FIG. 2(A). Furthermore, the plurality of extending arms 30A-30D are disposed between the support unit (outer surface of the resilient set 10) and the teeth-gap sets 20 for connecting each tooth 20A-20D to the corresponding outer surface of the resilient set 10 (the corresponding support units). Again, on the one side of the teeth-gap sets 20, a grating plane 25 is formed by the outer surfaces 201 of the teeth and the second gaps 202, and a diffraction pitch d is formed by each teeth width and each second gap width. In a further embodiment of the present invention, the grating 100 is manufactured with the MEMS-based process. Please refer to FIG. 3(B), which shows an electron microscope picture of the grating 100. It is obvious from the FIG. 3(B) that each tooth and the corresponding extending arm and the corresponding support unit are designed to be a one-piece formed structure. With the aid of the purposeful structure, the grating pitch d is no longer constrained by the width of the support unit 101. Therefore, the attainable grating pitch could be closer to the minimum line-width of the structure, especially for the MEMS-based processed structure, which will increase the dispersion efficiency of the grating remarkably.

Figure 4:
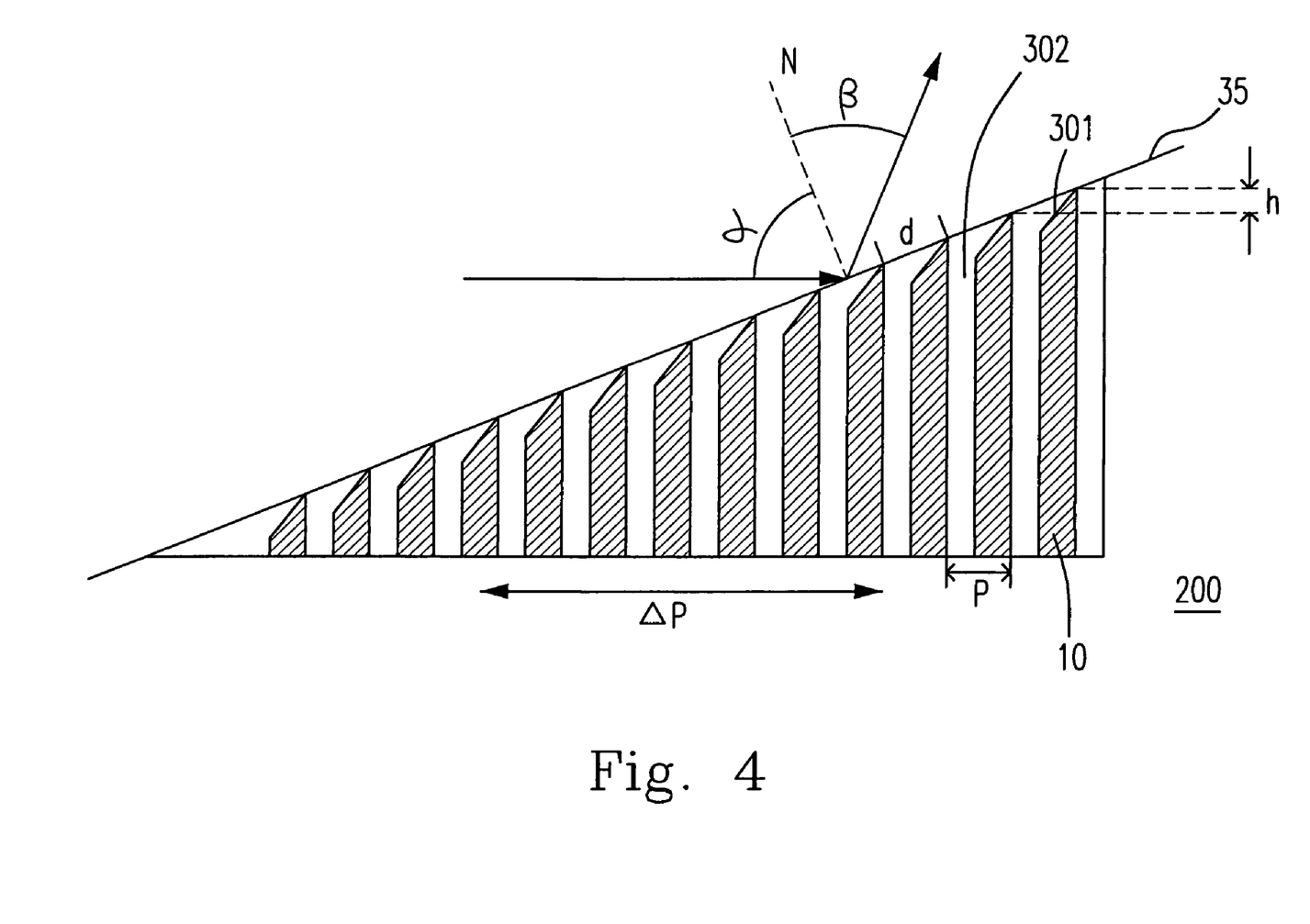
FIG. 4 shows a top view diagram of a grating structure according to a second embodiment of the present invention.

Please refer to FIG. 4, which shows a top view diagram of a further grating structure according to a second embodiment of the present invention. The technical features of the grating structure are that a grating plane 35 of the grating 200 is formed by a plurality of outer surfaces 301 of the grating units 10 (i.e. tooth unit) and a plurality of gaps 302, which are disposed alternately. As can be seen from FIG. 4, each grating unit length increases along a modulation direction of the gap width (represented by the symbol, ΔP, of FIG. 4). In one preferred embodiment of the present invention, the grating 200 is used for diffracting an energy beam incident in a direction parallel to the modulation direction of the gap width. When the plurality of grating units 10 are linearly moveable in parallel with the incident direction of a collimated energy beam (ΔP direction), the change of the grating pitch d does not result in any change as "seen" by the incident light, meaning that the same amount of energy beam illuminated on the grating 200 is diffracted regardless of the modulation of the grating pitch d, so that the diffracted energy remains unchanged.

On the other hand, another measure for estimating the performance of a grating is the resolving power (RP) defined as follows:

$$RP=\lambda/\Delta\lambda=Nm \qquad (2)$$

where N denotes the number of the grating units (or teeth), m the diffraction order, and Δλ the minimum wavelength interval of two spectral components that are just resolvable by Rayleigh's criterion. It can be seen from equation (2) that a way to improve the dispersion performance of the grating is to increase the product of the diffraction order m and the number of the grating units N.

In a third embodiment of the present invention, a method for separating a beam at selected wavelength $\lambda_m$ from an energy beam with continuous spectrum is provided. As have been predicted from the equation (1), a diffracted energy beam received in the direction of the diffraction angle β includes the spectral component in the diffraction order m and wavelength $\lambda_m$ in addition to the successive orders 2m, 3m, . . . , nm, and wavelengths $\lambda_m/2$, $\lambda_m/3$, . . . , $\lambda_m/n$. Through the appropriate modulation of the grating pitch, the desired beam with selected wavelength $\lambda_m$ can be separated from the rest-of the overlapped spectral components. Please refer to FIG. 5(A), which shows a flow chart of the method of the third embodiment of the present invention. The method includes the following steps. In step 001, providing a diffraction grating, such as the grating 100 or 200, for diffracting the incident energy beam to a diffracted beam. Second, in step 002, disposing a detector on a direction of the diffraction angle β. When the grating 100 or 200 is illuminated with the incident energy beam at an incident angle α, the diffracted beam in diffraction order m, an integer, and at wavelength $\lambda_m$ can be received by the detector. Next, in step 003, modulating the grating pitch continuously for receiving a first power of the diffracted beam in diffraction order m and at wavelengths from $\lambda_m$ to $2\lambda_m^-$, a wavelength less than $2\lambda_m$, so that the spectrum in the range of $\lambda_m$ to $2\lambda_m^-$, is obtained. In step 004, further continuously modulating the grating pitch for receiving a second power of the diffracted beam in diffraction order m and at wavelengths from $2\lambda_m$ to $3\lambda_m^-$, a wavelength less than $3\lambda_m$, wherein the second power accompanies that in diffraction order 2m and at wavelengths from $\lambda_m$ to $(3/2)\lambda_m^-$. Next, in step 005, subtracting the first power from the second power for obtaining each power of the diffraction beam at wavelengths from $2\lambda_m$ to $3\lambda_m^-$. Similarly, in step 006, further continuously modulating the grating pitch for receiving a third power of the diffracted beam in diffraction order m and at wavelengths from $3\lambda_m$ to $4\lambda_m^-$, a wavelength less than $4\lambda_m$, wherein the third power accompanies that in diffraction order 2m and at wavelengths from $(3/2)\lambda_m$ to $(4/2)\lambda_m^-$ and that in diffraction order 3m and at wavelengths from $(3/3)\lambda_m$ to $(4/3)\lambda_m^-$. Consequently, in step 007, subtracting the first and second power in corresponding wavelengths from the third power for obtaining each power of the diffraction beam at wavelengths from $3\lambda_m$ to $4\lambda_m^-$. Accordingly, in step 008, iteratively repeating steps 006 and 007 for receiving a fourth, fifth, . . . , and nth power in overlapped orders and subtracting the overlapped power by each corresponding power obtained in preceding steps, so that each power from $\lambda_m$ to $n\lambda_m$ is obtained.

Figure 5A:
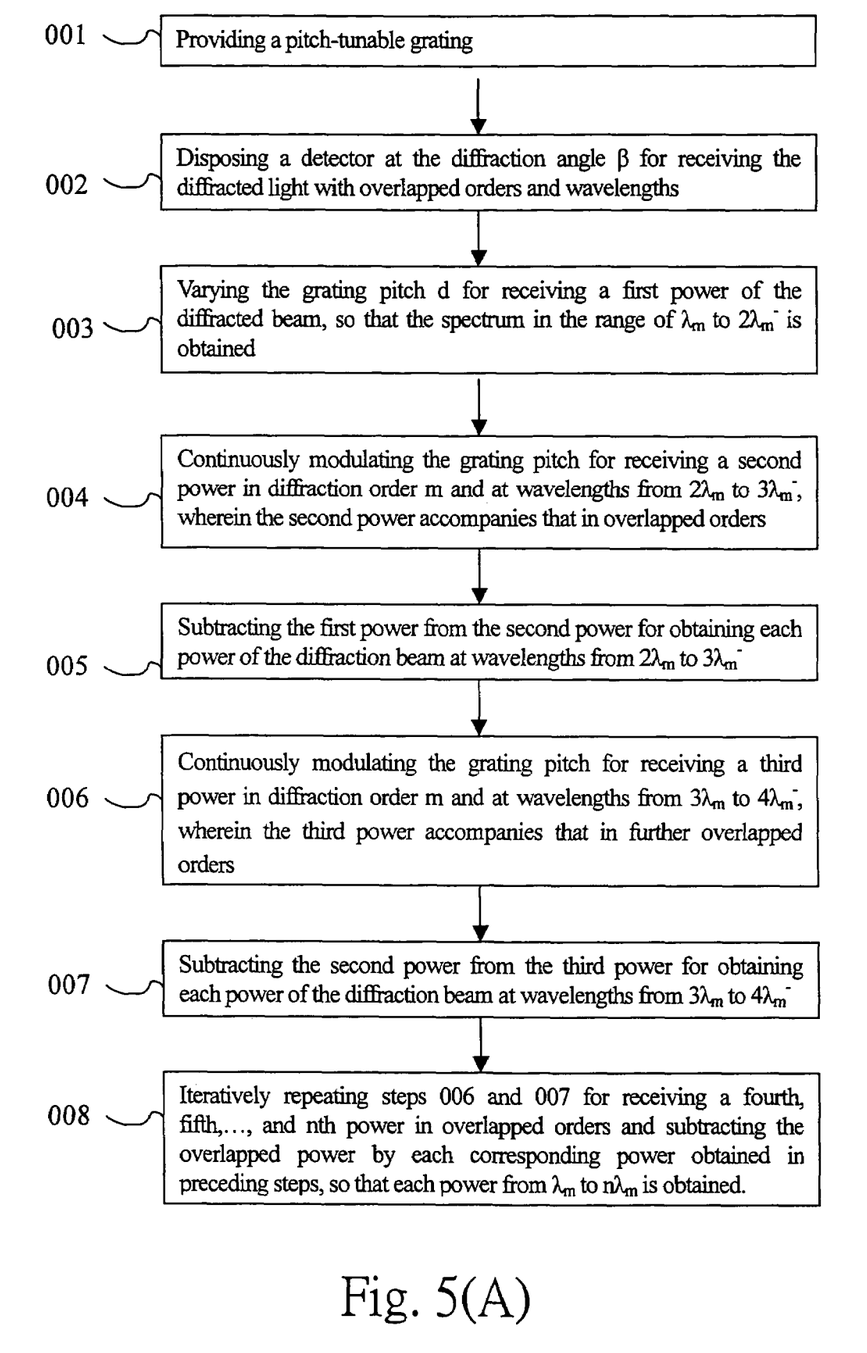
FIG. 5(A) shows a flow chart of the method of the third embodiment of the present invention.

Specifically, in step 003 mentioned above, the change of the grating pitch is based on the following equations.

$$n=\lambda/\lambda_0 \qquad (3)$$

$$c=\alpha-\beta \qquad (4)$$

$$p=(n*p_0*(1+\cos(c))-h*\sin(c)*(n-1))/(1+\cos(c)) \qquad (5)$$

where $\lambda_0$ denotes the wavelength detected initially during modulation, c denotes the difference between the angles of incidence and diffraction, which remains a constant when modulating the pitches, h denotes the difference of heights between adjacent teeth in the grating, and $p_0$ denotes the corresponding pitch of the grating initially along the propagation direction of the incident light. Therefore, the relationship between the wavelength of the diffracted energy beam and the corresponding grating pitch can be found from equations (3)-(5).

Figure 5B:
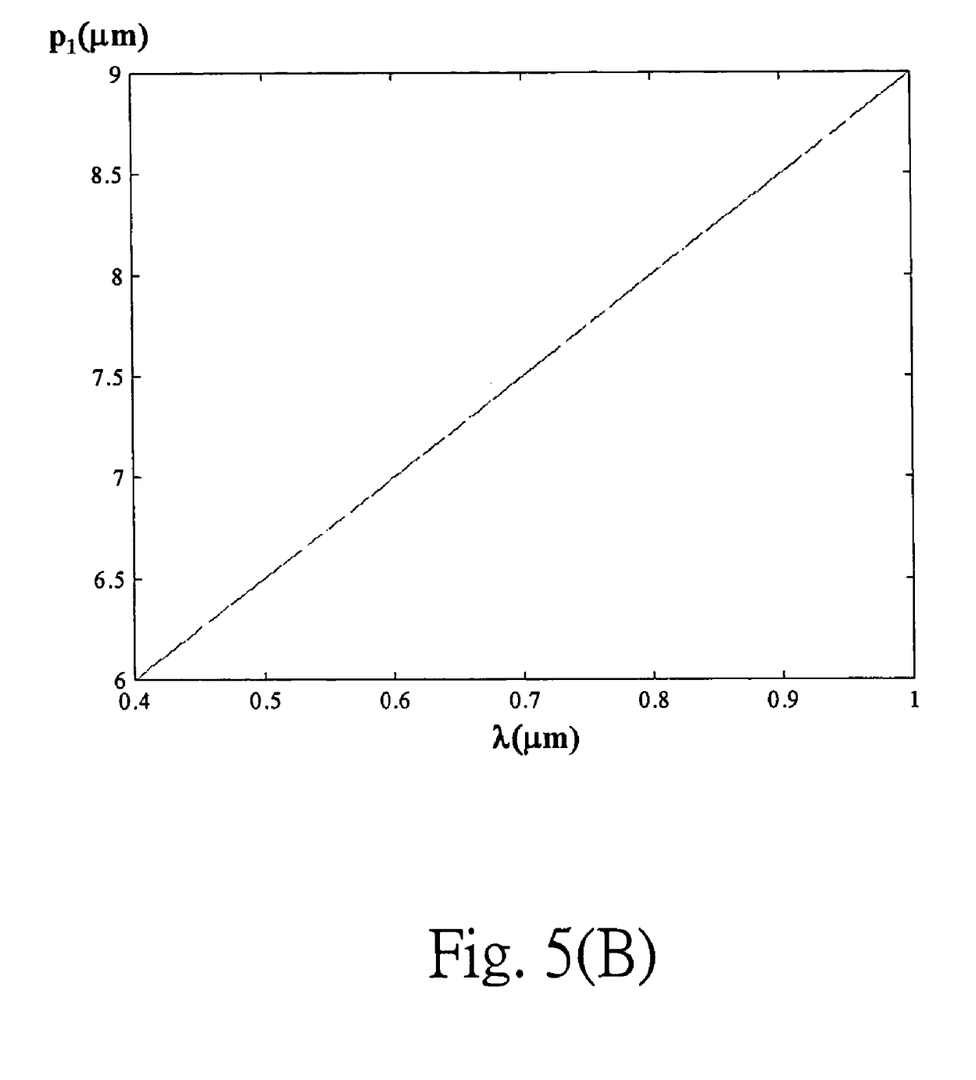
FIG. 5(B) shows a relationship between the grating pitch and the wavelength of the diffracted energy beam.

Taking the grating 200 as an example, because the above-mentioned parameters of the grating 200 are given, the relationship between the wavelength of the diffracted energy beam and the grating pitch can be obtained, as have been shown in FIG. 5(B). Taking p=8 μm for instance, the light of wavelength λ=400 nm accompanies that of λ=800 nm. In this case, the collected power of λ=400 nm is the same as that of the case at p=6 μm. Then the spectral component at λ=800 nm can obtained if the power detected at the case p=6 μm is subtracted from that in the case p=8 μm, resulting in the elimination of an order sorting filter to separate the energy of λ=800 nm from λ=400 nm.

In a fourth preferred embodiment of the present invention, a novel dispersive optical system is provided. Please refer to FIG. 6, which shows the configuration of the dispersive optical system according to the fourth preferred embodiment of the present invention. The dispersive optical system 500 includes a first and a second pitch-tunable gratings 510, 520, and a beam expander 530. The first gratings having a first grating pitch $d_1$ is disposed in such a way that an energy beam 511 irradiating the first grating at the incident angles α is diffracted into a first diffracted energy beam 512 at the diffraction angles β. The first diffracted energy beam 512 is then redirected to the second grating having a second grating pitch $d_2$ at the same incident angle α and is diffracted thereby into a second diffracted energy beam 513 at the same diffraction angle β. Furthermore, the beam expender 530 including a combination of two lenses 531, 532, and a slit 535 (not shown in scale in FIG. 6) is disposed on the propagation path of the first diffracted energy beam, by which the unwanted energy beam diffracted by the first grating at the angles other than β is eliminated.

Figure 6:
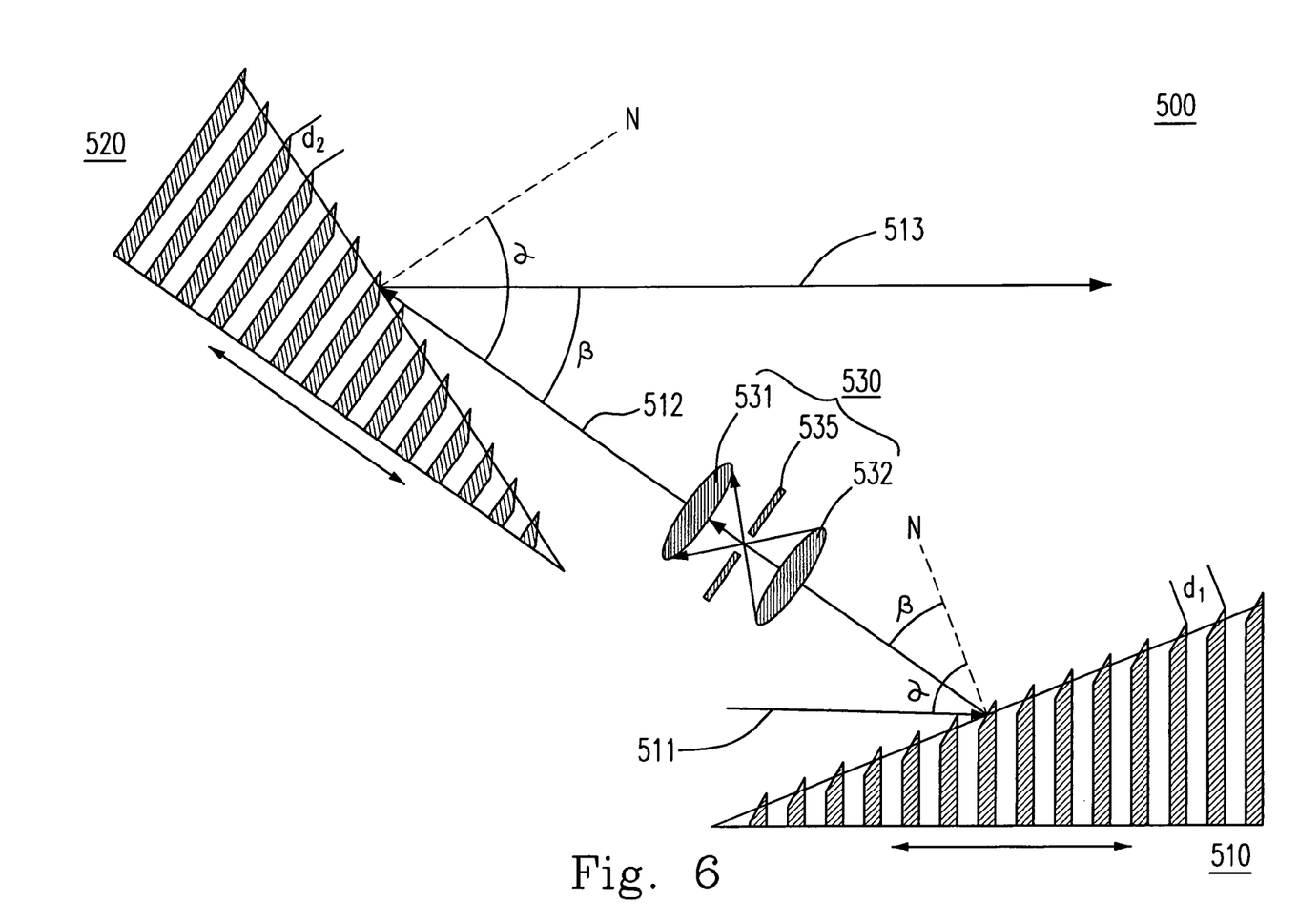
FIG. 6 shows the configuration of the dispersive optical system according to the fourth preferred embodiment of the present invention.

In this preferred embodiment of the present invention, the first and the second gratings are selected from the above-mentioned grating 100 or 200, while the first and the second grating pitches $d_1$ and $d_2$ are not identical ($d_1 \neq d_2$). Furthermore, the ratio of the first and the second pitches $d_1$ and $d_2$ is defined by the following relationship:

$$d_1/d_2 = m/m' \quad (6)$$

where m and m' denote the diffraction orders of the first and second diffracted energy beams 512 and 513, respectively. An advantage for this dispersive optical system 500 is to reduce the needed number of teeth but still retain the high resolving power (RP). Therefore, with the design of the dispersive optical system 500, a further method according to the fifth embodiment of the present invention for separating an energy beam at a selected wavelength from an energy beam with the overlapped wavelengths is provided.

Figure 7:
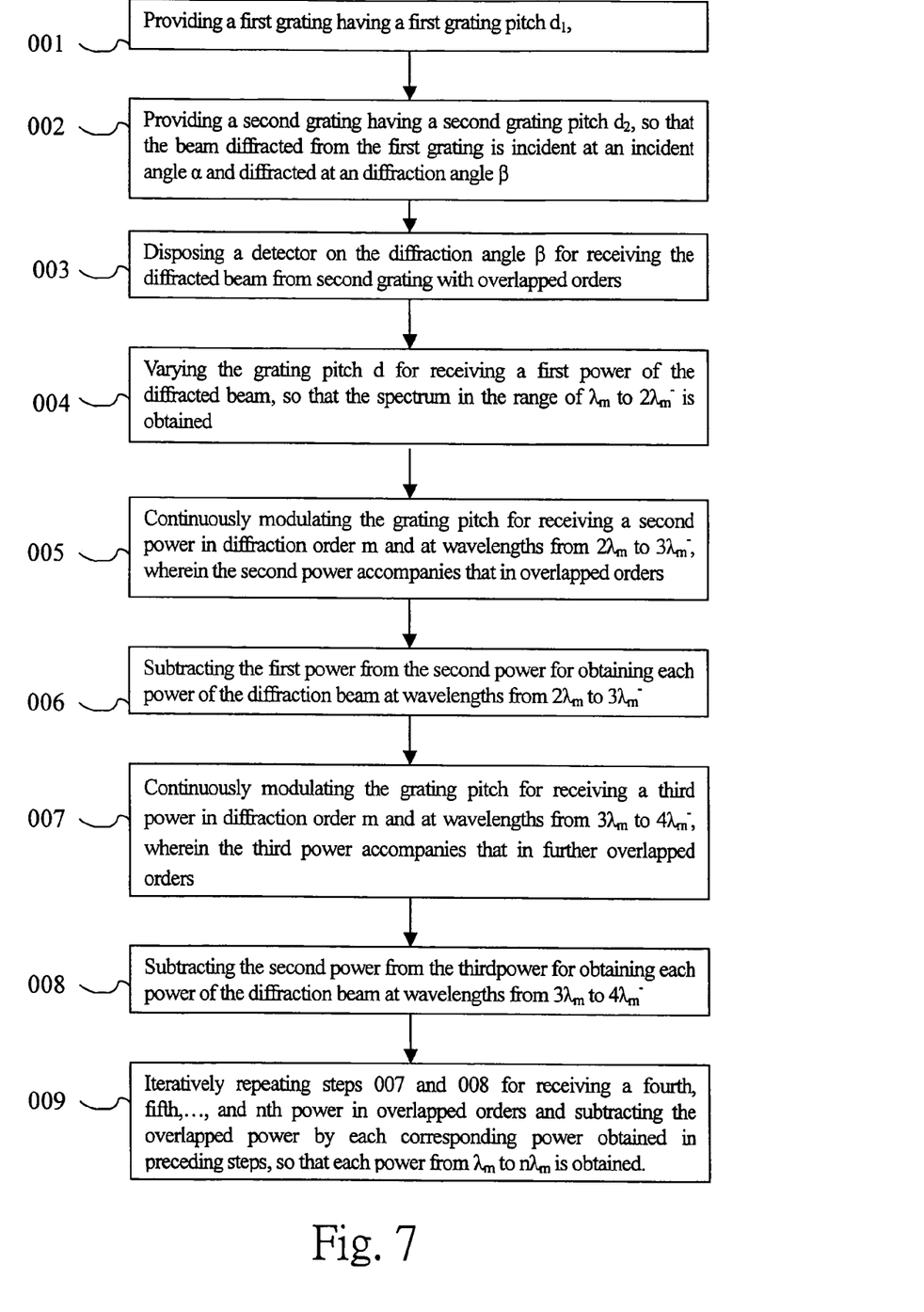
FIG. 7 shows a flow chart of the method according to this fifth embodiment of the present invention.

Please refer to FIG. 7, which show a flow chart of the method according to this fifth embodiment of the present invention. The method includes the following steps. In step 0001, providing a first grating having a first grating pitch $d_1$, so that an energy beam illuminating thereinto is incident at an incident angle α and diffracted at an diffraction angle β for forming a first diffracted energy beam. In step 0002, providing a second grating having a second grating pitch $d_2$, so that the first diffracted energy beam is further directed thereinto at the incident angle α and further diffracted at the diffraction angle β for forming a second diffracted energy beam. In step 0003, disposing a detector in a direction of the diffraction angle β for receiving the second diffracted beam in diffraction order m and at wavelength $\lambda_m$, where $\lambda_m$ is the shortest wavelength over the spectrum of interest. Next, in step 0004, modulating the grating pitches continuously for receiving a first power of the second diffracted beam in diffraction order m and at wavelengths from $\lambda_m$ to $2\lambda_m^-$, a wavelength less than $2\lambda_m$, so that the spectrum in the range of $\lambda_m$ to $2\lambda_m^-$ is obtained. In step 0005, further continuously modulating the grating pitch for receiving a second power of the second diffracted beam in diffraction order m and at wavelengths from $2\lambda_m$ to $3\lambda_m^-$, a wavelength less than $3\lambda_m$, wherein the second power accompanies that in diffraction order 2m and at wavelengths from $\lambda_m$ to $(3/2)\lambda_m^-$. In step 0006, subtracting the first power from the second power for obtaining each power of the diffraction beam at wavelengths from $2\lambda_m$ to $3\lambda_m^-$. In step 0007, further continuously modulating the grating pitch for receiving a third power of the second diffracted beam in diffraction order m and at wavelengths from $3\lambda_m$ to $4\lambda_m^-$, a wavelength less than $4\lambda_m$, wherein the third power accompanies that in diffraction order 2m and at wavelengths from $(3/2)\lambda_m$ to $(4/2)\lambda_m^-$ and that in diffraction order 3m and at wavelengths from $(3/3)\lambda_m$ to $(4/3)\lambda_m^-$. In step 0008, subtracting the first and second power in corresponding wavelengths from the third power for obtaining each power of the diffraction beam at wavelengths from $3\lambda_m$ to $4\lambda_m^-$. Accordingly, iteratively repeating steps 0007 and 0008 for receiving a fourth, fifth, . . . , and nth power in overlapped orders and subtracting the overlapped power by each corresponding power obtained in preceding steps, so that each power from $\lambda_m$ to $n\lambda_m$ is obtained.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A diffraction grating, comprising:
    a resilient set comprising a plurality of support units with a support unit width and first gaps with a first gap width arranged alternately;
    a grating plane disposed on said resilient set and comprising a plurality of teeth with a tooth width and second gaps with a second gap width arranged alternately; and
    a plurality of extending arms connecting said support units to said teeth, respectively,
    wherein a modulation pitch d' is formed by said support unit width and said first gap width, a grating pitch d is formed by said tooth width and said second gap width, and said modulation pitch d' is greater than said grating pitch.

2. The diffraction grating according to claim 1, wherein an energy beam illuminated from said grating plane is diffracted into a diffracted energy beam, and an equation, $d(\sin(\alpha) + \sin(\beta)) = m\lambda$, is satisfied, wherein d denotes said grating pitch, α denotes an incident angle of said energy beam, β denotes a diffraction angle of said diffracted energy beam, m denotes a diffraction order, and λ denotes a wavelength of said diffracted energy beam.

3. The diffraction grating according to claim 2, wherein said wavelength λ of said diffracted energy beam is modulated by varying said grating pitch d.

4. The diffraction grating according to claim 1, wherein said first gap width is modulated by deformation of said resilient set.

5. The diffraction grating according to claim 1, wherein said modulation pitch d' and said grating pitch d are varied with said first gap width.

* * * * *